United States Patent
Hong et al.

(10) Patent No.: US 10,177,836 B2
(45) Date of Patent: Jan. 8, 2019

(54) RADIO FREQUENCY SELF-INTERFERENCE-CANCELLED FULL-DUPLEX RELAYS

(71) Applicant: Kumu Networks, Inc., Santa Clara, CA (US)

(72) Inventors: Steven Hong, Sunnyvale, CA (US); Jeffrey Mehlman, Sunnyvale, CA (US); Joel Brand, Santa Clara, CA (US); Jung-Il Choi, Satatoga, CA (US); Mayank Jain, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

(21) Appl. No.: 14/473,653

(22) Filed: Aug. 29, 2014

(65) Prior Publication Data
US 2015/0063176 A1  Mar. 5, 2015

Related U.S. Application Data
(60) Provisional application No. 61/871,519, filed on Aug. 29, 2013.

(51) Int. Cl.
   *H04B 7/0413* (2017.01)
   *H04B 7/155* (2006.01)

(52) U.S. Cl.
   CPC ....... *H04B 7/15585* (2013.01); *H04B 7/0413* (2013.01)

(58) Field of Classification Search
   CPC .................................................. H04B 7/0413
   See application file for complete search history.

(56) References Cited

U.S. PATENT DOCUMENTS

| | | |
|---|---|---|
| 3,922,617 A | 11/1975 | Denniston et al. |
| 4,321,624 A | 3/1982 | Gibson et al. |

(Continued)

FOREIGN PATENT DOCUMENTS

| | | |
|---|---|---|
| CN | 102694562 | 9/2012 |
| EP | 0755141 B1 | 10/2005 |

(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.

(Continued)

*Primary Examiner* — Sulaiman Nooristany
(74) *Attorney, Agent, or Firm* — Jeffrey Schox; Thomas Gwinn

(57) ABSTRACT

A relay including a first transmitter that converts a first digital transmit signal to a first analog transmit signal, a first receiver that converts a first analog receive signal to a first digital receive signal, a second transmitter that converts a second digital transmit signal to a second analog transmit signal, a second receiver that converts a second analog receive signal to a second digital receive signal, and a self-interference canceller that generates a first self-interference cancellation signal based on at least one of the first digital transmit signal and the first analog transmit signal, and combines the first self-interference cancellation signal with at least one of the first digital receive signal and the first analog receive signal.

8 Claims, 11 Drawing Sheets

(56) References Cited

U.S. PATENT DOCUMENTS

| | | |
|---|---|---|
| 4,952,193 A | 8/1990 | Talwar |
| 5,212,827 A | 5/1993 | Meszko et al. |
| 5,691,978 A | 11/1997 | Kenworthy |
| 5,734,967 A | 3/1998 | Kotzin et al. |
| 5,790,658 A | 8/1998 | Yip et al. |
| 5,818,385 A | 10/1998 | Bartholomew |
| 5,930,301 A | 7/1999 | Chester et al. |
| 6,215,812 B1 | 4/2001 | Young et al. |
| 6,240,150 B1 | 5/2001 | Darveau et al. |
| 6,317,583 B1 | 11/2001 | Wolcott et al. |
| 6,411,250 B1 | 6/2002 | Oswald et al. |
| 6,539,204 B1 | 3/2003 | Marsh et al. |
| 6,567,649 B2 | 5/2003 | Souissi |
| 6,639,551 B2 | 10/2003 | Li et al. |
| 6,657,950 B1 | 12/2003 | Jones et al. |
| 6,725,017 B2 | 4/2004 | Blount et al. |
| 6,915,112 B1 | 7/2005 | Sutton et al. |
| 6,965,657 B1 | 11/2005 | Rezvani et al. |
| 7,139,543 B2 | 11/2006 | Shah |
| 7,336,940 B2 | 2/2008 | Smithson |
| 7,349,505 B2 | 3/2008 | Blount et al. |
| 7,362,257 B2 | 4/2008 | Bruzzone et al. |
| 7,397,843 B2 | 7/2008 | Grant et al. |
| 7,426,242 B2 | 9/2008 | Thesling |
| 7,509,100 B2 | 3/2009 | Toncich |
| 7,706,755 B2 | 4/2010 | Muhammad et al. |
| 7,778,611 B2 | 8/2010 | Asai et al. |
| 7,869,527 B2 | 1/2011 | Vetter et al. |
| 7,987,363 B2 | 7/2011 | Chauncey et al. |
| 8,005,235 B2 | 8/2011 | Rebandt, II et al. |
| 8,027,642 B2 | 9/2011 | Proctor et al. |
| 8,055,235 B1 | 11/2011 | Gupta et al. |
| 8,060,803 B2 | 11/2011 | Kim |
| 8,081,695 B2 | 12/2011 | Chrabieh et al. |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,274,342 B2 | 9/2012 | Tsutsumi et al. |
| 8,331,477 B2 | 12/2012 | Huang et al. |
| 8,349,933 B2 | 1/2013 | Bhandari et al. |
| 8,351,533 B2 | 1/2013 | Shrivastava et al. |
| 8,385,871 B2 | 2/2013 | Wyville |
| 8,417,750 B2 | 4/2013 | Yan et al. |
| 8,422,540 B1 | 4/2013 | Negus et al. |
| 8,457,549 B2 | 6/2013 | Weng et al. |
| 8,462,697 B2 | 6/2013 | Park et al. |
| 8,502,924 B2 | 8/2013 | Liou et al. |
| 8,521,090 B2 | 8/2013 | Kim et al. |
| 8,711,943 B2 | 4/2014 | Rossato et al. |
| 8,755,756 B1 | 6/2014 | Zhang et al. |
| 8,842,584 B2 | 9/2014 | Jana et al. |
| 8,995,410 B2 | 3/2015 | Balan et al. |
| 9,019,849 B2 | 4/2015 | Hui et al. |
| 9,042,838 B2 | 5/2015 | Braithwaite |
| 9,054,795 B2 | 6/2015 | Choi et al. |
| 9,077,421 B1 | 7/2015 | Mehlman et al. |
| 9,124,475 B2 | 9/2015 | Li et al. |
| 9,136,883 B1 | 9/2015 | Moher et al. |
| 9,184,902 B2 | 11/2015 | Khojastepour et al. |
| 9,231,647 B2 | 1/2016 | Polydoros et al. |
| 9,312,895 B1 | 4/2016 | Gupta et al. |
| 9,461,698 B2 | 10/2016 | Moffatt et al. |
| 2002/0034191 A1 | 3/2002 | Shattil |
| 2002/0064245 A1 | 5/2002 | McCorkle |
| 2002/0154717 A1* | 10/2002 | Shima ............... H04B 1/71072 375/349 |
| 2002/0172265 A1 | 11/2002 | Kenney |
| 2003/0031279 A1 | 2/2003 | Blount et al. |
| 2003/0099287 A1 | 5/2003 | Arambepola |
| 2003/0104787 A1 | 6/2003 | Blount et al. |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1 | 11/2005 | Varma et al. |
| 2005/0254555 A1 | 11/2005 | Teague |
| 2005/0282500 A1 | 12/2005 | Wang et al. |
| 2006/0030277 A1 | 2/2006 | Cyr et al. |
| 2006/0058022 A1 | 3/2006 | Webster et al. |
| 2006/0209754 A1 | 9/2006 | Ji et al. |
| 2006/0273853 A1 | 12/2006 | Suzuki et al. |
| 2007/0018722 A1 | 1/2007 | Jaenecke |
| 2007/0207747 A1 | 9/2007 | Johnson et al. |
| 2007/0249314 A1 | 10/2007 | Sanders et al. |
| 2007/0274372 A1 | 11/2007 | Asai et al. |
| 2008/0037801 A1 | 2/2008 | Alves et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0192636 A1 | 8/2008 | Briscoe et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0180404 A1 | 7/2009 | Jung et al. |
| 2009/0186582 A1 | 7/2009 | Muhammad et al. |
| 2009/0303908 A1 | 12/2009 | Deb et al. |
| 2009/0325509 A1 | 12/2009 | Mattisson et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0056166 A1 | 3/2010 | Tenny |
| 2010/0103900 A1 | 4/2010 | Yeh et al. |
| 2010/0117693 A1 | 5/2010 | Lorg et al. |
| 2010/0136900 A1 | 6/2010 | Seki |
| 2010/0150033 A1 | 6/2010 | Zinser et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0026509 A1 | 2/2011 | Tanaka |
| 2011/0081880 A1 | 4/2011 | Ahn |
| 2011/0149714 A1 | 6/2011 | Rimini et al. |
| 2011/0216813 A1 | 9/2011 | Baldemair et al. |
| 2011/0222631 A1 | 9/2011 | Jong |
| 2011/0243202 A1 | 10/2011 | Lakkis |
| 2011/0250858 A1 | 10/2011 | Jain et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1 | 9/2012 | Lindoff et al. |
| 2013/0005284 A1 | 1/2013 | Dalipi |
| 2013/0044791 A1 | 2/2013 | Rimini et al. |
| 2013/0056270 A1 | 3/2013 | Ward |
| 2013/0089009 A1* | 4/2013 | Li ............... H04L 27/2601 370/278 |
| 2013/0102254 A1* | 4/2013 | Cyzs ............... H04B 1/126 455/63.1 |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |

(56) References Cited

U.S. PATENT DOCUMENTS

| | | |
|---|---|---|
| 2013/0259343 A1 | 10/2013 | Liu et al. |
| 2013/0301487 A1 | 11/2013 | Khandani |
| 2013/0301488 A1* | 11/2013 | Hong ............ H04B 1/56 370/278 |
| 2013/0308717 A1 | 11/2013 | Maltsev et al. |
| 2014/0011461 A1 | 1/2014 | Bakalski et al. |
| 2014/0126437 A1 | 5/2014 | Patil et al. |
| 2014/0169236 A1 | 6/2014 | Choi et al. |
| 2014/0185533 A1 | 7/2014 | Haub |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0313946 A1 | 10/2014 | Azadet |
| 2014/0348018 A1 | 11/2014 | Bharadia et al. |
| 2014/0348032 A1 | 11/2014 | Hua et al. |
| 2014/0376416 A1* | 12/2014 | Choi ............ H04B 3/23 370/277 |
| 2015/0139122 A1 | 5/2015 | Rimini et al. |
| 2015/0156003 A1 | 6/2015 | Khandani |
| 2015/0156004 A1 | 6/2015 | Khandani |
| 2015/0188646 A1 | 7/2015 | Bharadia et al. |
| 2015/0215937 A1 | 7/2015 | Khandani |
| 2015/0249444 A1 | 9/2015 | Shin et al. |
| 2015/0303984 A1 | 10/2015 | Braithwaite |
| 2016/0218769 A1 | 7/2016 | Chang et al. |

FOREIGN PATENT DOCUMENTS

| | | |
|---|---|---|
| EP | 1959625 B1 | 2/2009 |
| EP | 2237434 | 10/2010 |
| EP | 2267946 A2 | 12/2010 |
| JP | 180597 | 7/2007 |
| JP | 103719 | 5/2010 |
| JP | 166529 | 8/2011 |
| RU | 2256985 C2 | 7/2005 |
| WO | 095386 | 6/2013 |
| WO | 2013056270 | 7/2013 |
| WO | 2013173250 A1 | 11/2013 |
| WO | 2013185106 A1 | 12/2013 |
| WO | 2014093916 A1 | 6/2014 |

OTHER PUBLICATIONS

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

* cited by examiner

RADIO FREQUENCY SELF-INTERFERENCE-CANCELLED FULL-DUPLEX RELAYS

CROSS-REFERENCE TO RELATED APPLICATIONS

This application claims the benefit of U.S. Provisional Application Ser. No. 61/871,519, filed on 29 Aug. 2013, which is incorporated in its entirety by this reference.

TECHNICAL FIELD

This invention relates generally to the wireless communications field, and more specifically to new and useful full-duplex relays.

BACKGROUND

In many wireless communication networks, there are areas that are not easily covered by access points due to signal attenuation by terrain or other structural obstacles. One approach to extending access point signal coverage involves using relay nodes that rebroadcast signals originating from and/or destined to access points.

One major roadblock to successful implementation of relays is the problem of self-interference; relays may suffer from issues resulting from cross-talk between transmitters and receivers, duplexer leakages, or other undesired electromagnetic couplings. Many modern relays use frequency or time division multiplexing techniques or antenna separation techniques to address self-interference. Each of these techniques has substantial drawbacks: frequency division multiplexing requires doubling spectrum usage, time division multiplexing requires halving signal capacity, and antenna separation is often expensive, if not impossible given space constraints. Full-duplex relays may address self-interference without any of these drawbacks. Thus, there is a need in the wireless communications field to create new and useful full-duplex relays. This invention provides such new and useful full-duplex relays.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
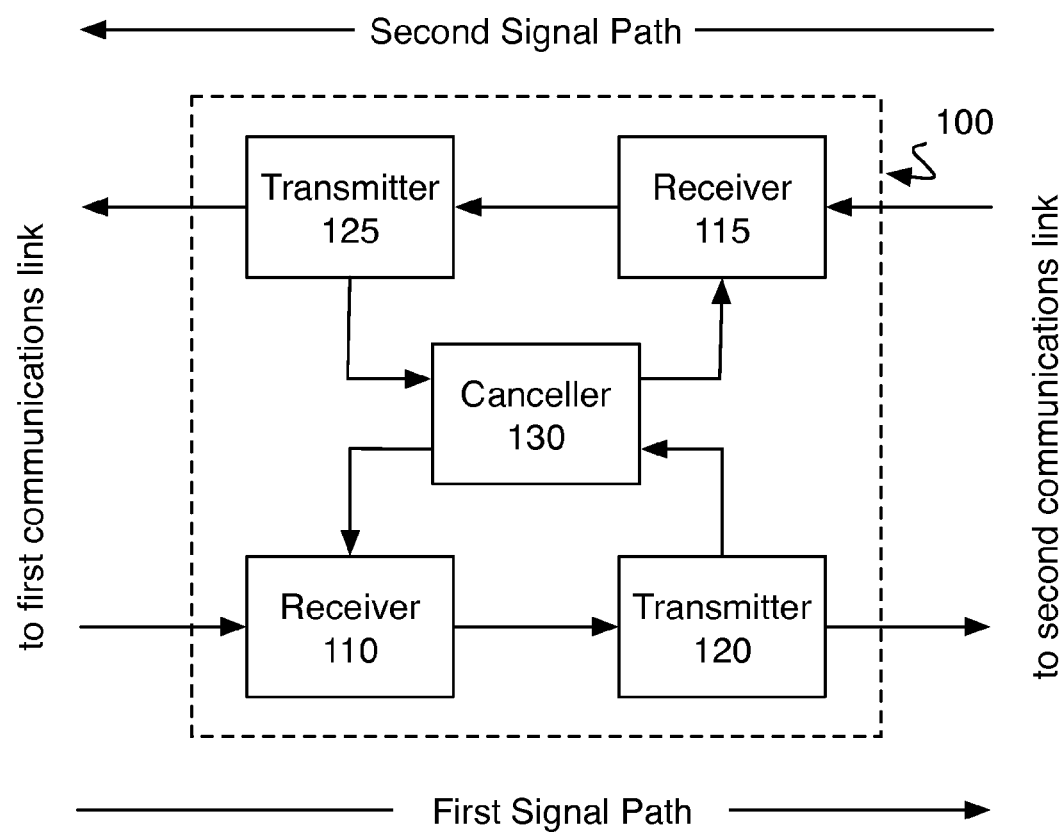
FIG. 1 is a diagram representation of a system of a preferred embodiment.

As shown in FIG. 1, a relay 100 includes a first receiver 110, a first transmitter 120, a second receiver 115, a second transmitter 125, and a self-interference canceller 130. The relay 100 functions to repeat communication signals transmitted and received between two communications systems. In addition to repeating signals, the relay 100 preferably cancels self-interference between transmitted and received signals. The relay 100 may additionally or alternatively scale (e.g. amplify, attenuate), shift, or otherwise modify signals received or transmitted by the relay 100.

The relay 100 is preferably used to repeat communication signals traveling bi-directionally between two wireless communication systems (e.g. a cell-phone tower and a cell phone, or a Wi-Fi™ access point and a computer, two wireless radios), but may additionally or alternatively be used to repeat communications signals between any other suitable wired or wireless communication systems. In a variation of a preferred embodiment, the relay 100 is a one-way relay and includes only a first receiver 110, a first transmitter 120, and a self-interference canceller 130.

The relay 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The relay 100 preferably includes memory to store configuration data, but may additionally or alternatively be configured using externally stored configuration data or in any suitable manner.

In one example implementation, the relay 100 is used as a cellular repeater. The relay 100 is connected to a cell tower by a first communications link using a first transmit/receive antenna coupled to the relay 100 by a duplexer, and to a cell phone by a second communications link using a second transmit/receive antenna coupled to the relay 100 by a duplexer. The cell phone and cell tower natively communicate at an uplink frequency (from phone to tower) and a downlink frequency (from tower to phone). The relay 100 receives and re-transmits communication on both the uplink frequency (phone to relay to tower) and the downlink frequency (tower to relay to phone). The self-interference canceller 130 enables full-duplex operation for the first transmit/receive antenna and the second transmit receive/antenna. This is distinct from traditional relays, which must rely on techniques like time-division multiplexing or antenna isolation to avoid self-interference. More specifically, the self-interference canceller 130 may enable the relay 100 to receive downlink communications (from tower to relay), retransmit downlink communications (from relay to phone), receive uplink communications (from phone to relay), and retransmit uplink communications (from relay to tower) simultaneously, without requiring antennas to be isolated from one another, the use of additional frequencies, or the use of time multiplexing. Thus, the relay 100 is able to provide network-relaying capability without excess cost, excess spectrum usage, or significantly decreased data capacity.

The first receiver 110 functions to receive analog receive signals transmitted by a first communications system over a first communications link (e.g., a wireless channel, a coaxial cable). The first receiver no preferably converts analog receive signals into digital receive signals for processing before re-transmission by the first transmitter 120, but may additionally or alternatively not convert analog receive signals (passing them through directly without conversion).

The first receiver no is preferably a radio-frequency (RF) receiver, but may additionally or alternatively be any suitable receiver.

Figure 2A:
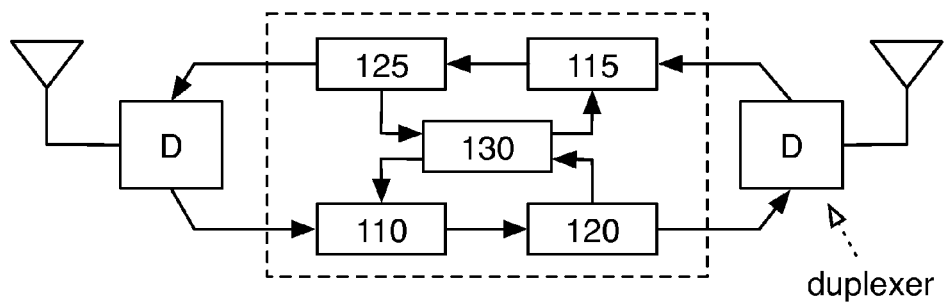
FIGS. 2A, 2B, and 2C are diagram representations of antenna couplings of a system of a preferred embodiment.
Figure 2B:
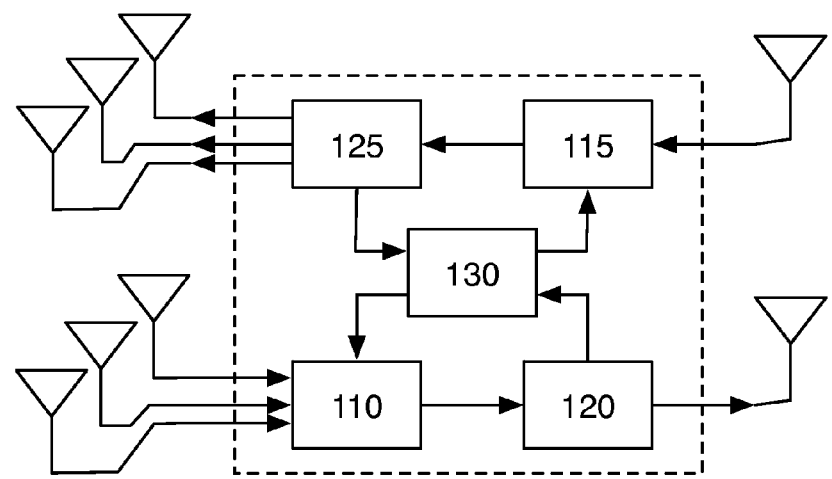
Figure 2C:
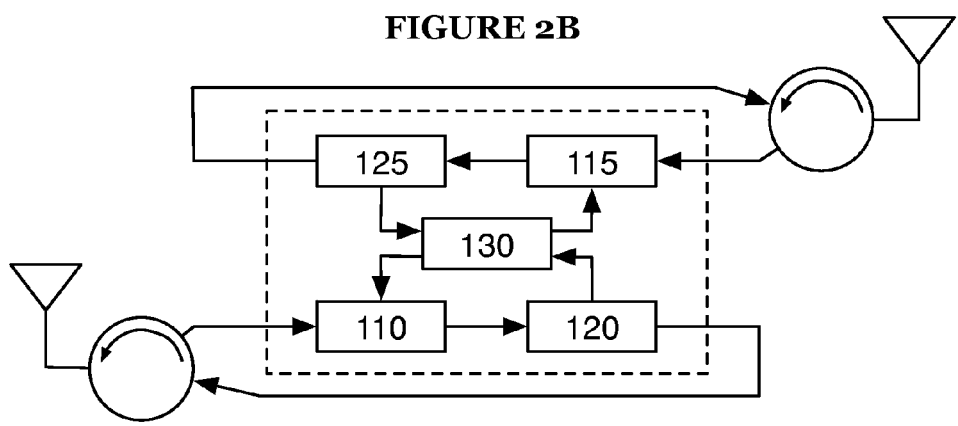

The first receiver 110 is preferably coupled to the first communications link by a duplexer-coupled RF antenna as shown in FIG. 2A, but may additionally or alternatively be coupled to the first communications link in any suitable manner. Some examples of alternative couplings include coupling via one or more dedicated receive antennas (as shown in FIG. 2B). In another alternative coupling, the first receiver no may be coupled to the first communications link by a circulator-coupled RF antenna as shown in FIG. 2C.

Figure 3:
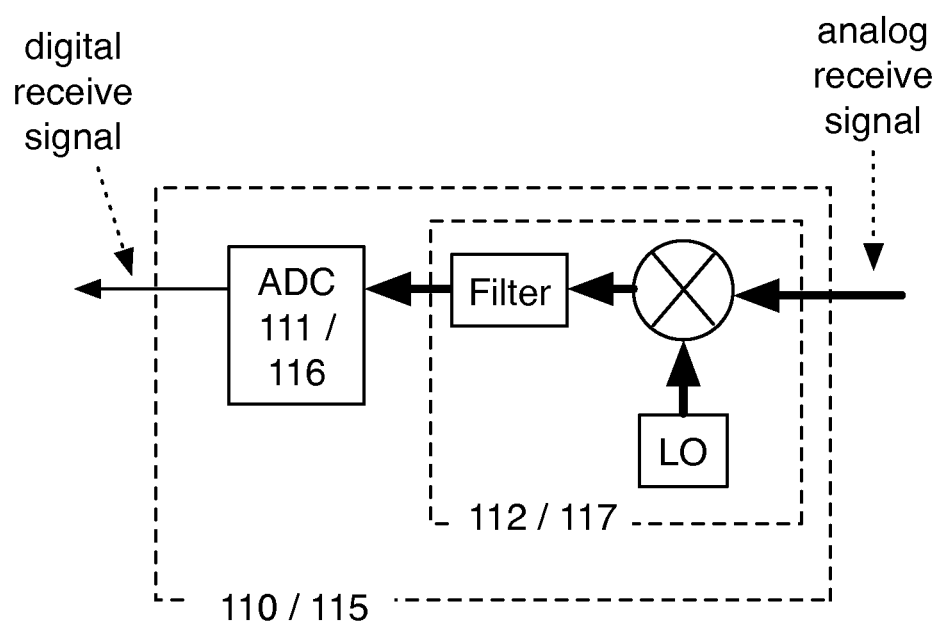
FIG. 3 is a schematic representation of a receiver of a system of a preferred embodiment.

The first receiver no preferably includes an analog-to-digital converter (ADC) in and a frequency downconverter 112, as shown in FIG. 3. The first receiver 110 may additionally or alternatively include amplifiers, filters, signal processors and/or any other suitable components. In one variation of a preferred embodiment, the first receiver no includes only analog processing circuitry (e.g., amplifiers, filters, attenuators, delayers). The first receiver may function to scale, shift, and/or otherwise modify the receive signal. The downconverter 112 functions to downconvert the analog receive signal from RF (or any other suitable frequency) to a baseband analog receive signal, and the analog-to-digital converter (ADC) in functions to convert the baseband analog receive signal to a digital receive signal.

The ADC 111 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC.

The frequency downconverter 112 functions to downconvert the carrier frequency of the analog receive signal to baseband, preparing it for conversion to a digital receive signal. The downconverter 112 preferably accomplishes signal downconversion using heterodyning methods, but may additionally or alternatively use any suitable upconversion methods.

The downconverter 112 preferably includes a local oscillator (LO), a mixer, and a baseband filter. The local oscillator functions to provide a frequency shift signal to the mixer; the mixer combines the frequency shift signal and the analog receive signal to create (usually two) frequency shifted signals, one of which is the baseband signal, and the baseband filter rejects signals other than the baseband analog receive signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, or any other suitable type of filter. The baseband filter is preferably a passive filter, but may additionally or alternatively be an active filter. The baseband filter is preferably implemented with analog circuit components, but may additionally or alternatively be digitally implemented.

The second receiver 115 functions to receive analog receive signals transmitted by a second communications system over a second communications link (e.g., a wireless channel, a coaxial cable). The second receiver 115 preferably converts analog receive signals into digital receive signals for processing before re-transmission by the second transmitter 125, but may additionally or alternatively not convert analog receive signals (passing them through directly without conversion).

The second receiver 115 preferably includes an analog-to-digital converter (ADC) 116 and a frequency downconverter 117, as shown in FIG. 3. The second receiver 115 is preferably substantially similar to the first receiver 110, but may additionally or alternatively be any suitable receiver.

The first transmitter 120 functions to retransmit signals received by the first receiver no. The first transmitter 120 preferably converts digital transmit signals into analog transmit signals, but may additionally or alternatively receive and retransmit analog transmit signals from the first receiver 110, thus avoiding digital-to-analog conversion. The transmit signals are preferably formed by processing receive signals (which may include analog-to-digital conversion or frequency shifting, for example) by the first receiver no, but the transmit signals may additionally or alternatively be any signal intended for transmission by the relay 100. The first transmitter 120 preferably transmits signals over a second communications link to a second communications system; these signals are preferably retransmitted signals from a first communication system sent to the relay 100 over a first communications link, but may additionally or alternatively be any suitable signals.

The first transmitter 120 is preferably a radio-frequency (RF) transmitter, but may additionally or alternatively be any suitable transmitter.

The first transmitter 120 is preferably coupled to the second communications link by a duplexer-coupled RF antenna as shown in FIG. 2A, but may additionally or alternatively be coupled to the second communications link in any suitable manner. Some examples of alternative couplings include coupling via one or more dedicated transmit antennas (as shown in FIG. 2B). In another alternative coupling, the first transmitter 120 may be coupled to the second communications link by a duplexer-coupled RF antenna as shown in FIG. 2C.

Figure 4:
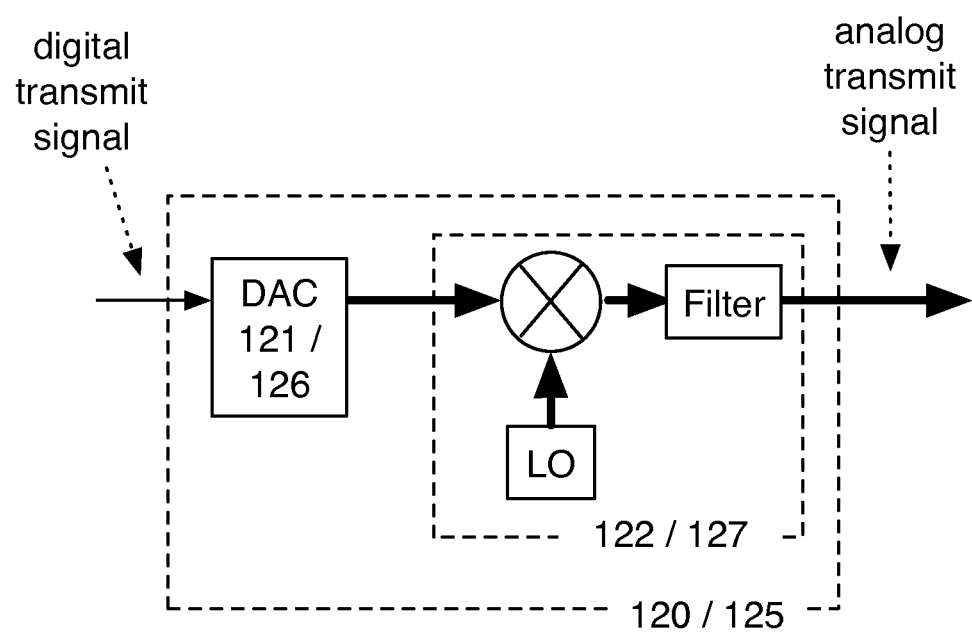
FIG. 4 is a schematic representation of a transmitter of a system of a preferred embodiment.

The first transmitter 120 preferably includes a digital-to-analog converter (DAC) 121 and a frequency upconverter 122, as shown in FIG. 4. The first transmitter 120 may additionally or alternatively include amplifiers, filters, signal processors and/or any other suitable components. The first transmitter 120 may function to scale, shift, and/or otherwise modify the transmit signal. The digital-to-analog converter (DAC) 121 functions to convert the digital transmit signal to a baseband analog transmit signal, and the upconverter 122 functions to upconvert the baseband analog transmit signal from baseband to RF (or any other intended transmission frequency).

The DAC 121 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

The frequency upconverter 122 functions to upconvert the carrier frequency of the baseband analog transmit signal to a radio frequency, preparing it for transmission over the communications link. The upconverter 122 preferably accomplishes signal upconversion using heterodyning methods, but may additionally or alternatively use any suitable upconversion methods.

The upconverter 122 preferably includes a local oscillator (LO), a mixer, and an RF filter. The local oscillator functions to provide a frequency shift signal to the mixer; the mixer combines the frequency shift signal and the baseband analog transmit signal to create (usually two) frequency shifted signals, one of which is the RF analog transmit signal, and the RF filter rejects signals other than the RF analog transmit signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/ or any other suitable components. The mixer preferably functions to combine two or more electrical input signals into one or more composite outputs, where each output includes some characteristics of at least two input signals.

The RF filter is preferably a bandpass filter centered around a tunable radio frequency. Additionally or alternatively, the RF filter may be a bandpass filter centered around a set radio frequency, or any other suitable type of filter. The RF filter is preferably a passive filter, but may additionally or alternatively be an active filter. The RF filter is preferably implemented with analog circuit components, but may additionally or alternatively be digitally implemented.

The second transmitter 125 functions to retransmit signals received by the second receiver 115. The second transmitter 125 preferably converts digital transmit signals into analog transmit signals, but may additionally or alternatively receive and retransmit analog signals from the second receiver 115, thus avoiding digital-to-analog conversion. The transmit signals are preferably formed by processing receive signals (which may include analog-to-digital conversion or frequency shifting, for example) by the second receiver 115, but the transmit signals may additionally or alternatively be any signal intended for transmission by the relay 100. The second transmitter 125 preferably transmits signals over a first communications link to a first communications system; these signals are preferably retransmitted signals from a second communication system sent to the relay 100 over a second communications link, but may additionally or alternatively be any suitable signals.

The second transmitter 125 preferably includes a digital-to-analog converter (DAC) 126 and a frequency upconverter 127, as shown in FIG. 4. The second transmitter 125 is preferably substantially similar to the first transmitter 120, but may additionally or alternatively be any suitable transmitter.

The self-interference canceller 130 functions to reduce self-interference in the relay 100 by canceling self-interference components present in receive signals of the relay 100. The self-interference canceller 130 preferably includes one or more analog self-interference cancellers 131; the self-interference canceller 130 may additionally or alternatively include a digital self-interference canceller 132, as shown in FIG. 5.

Analog self-interference cancellers 131 preferably reduce self-interference by sampling an analog transmit signal and generating an analog self-interference cancellation signal based on the input analog transmit signal. The analog self-interference cancellation signal is preferably combined with an analog receive signal before the analog receive signal is received by a receiver (e.g., 110 or 115), but may additionally or alternatively be combined with the receive signal at any suitable location or time.

Figure 5:
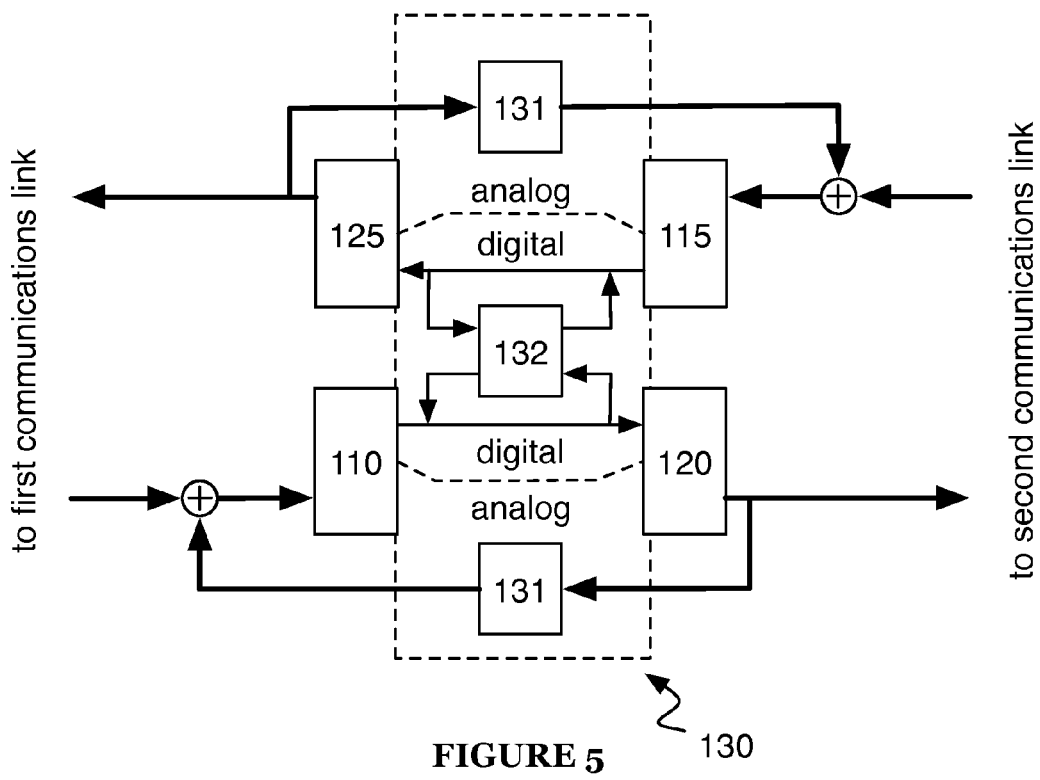
FIG. 5 is a diagram representation of a self-interference canceller of a system of a preferred embodiment.

Analog self-interference cancellers 131 preferably generate self-interference cancellation signals for a given analog receive signal from a corresponding direction analog transmit signal as shown in FIG. 5 (e.g., the self-interference cancellation signal combined with a re-transmitted uplink signal is preferably generated from the received uplink signal). Additionally or alternatively, analog self-interference cancellers 131 may generate self-interference cancellation signals for a given analog receive signal from any other analog transmit signal.

Figure 6:
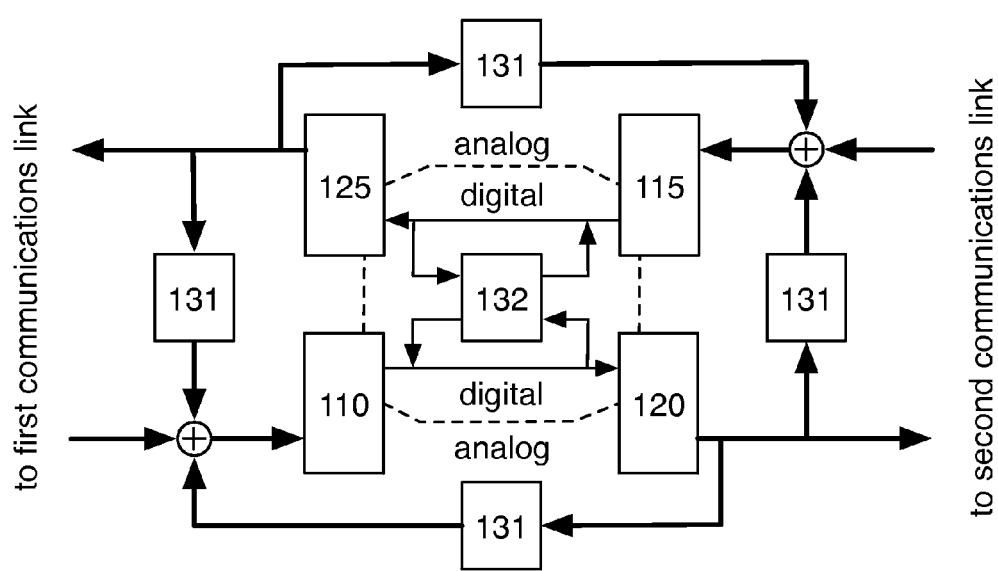
FIG. 6 is a diagram representation of a self-interference canceller of a system of a preferred embodiment.

For example, in situations where the relay 100 relays bi-directional communication (e.g., uplink/downlink) on well-separated frequencies, self-interference in the downlink receiver occurring from the uplink transmitter may be negligible (or vice versa); however, in situations where the uplink and downlink frequencies are closer, self-interference may occur across channels. In these situations it might be desirable to have hetero-channel as well as homo-channel self-interference cancellation, as shown in FIG. 6.

The analog self-interference canceller 131 is preferably implemented as an analog circuit that transforms an analog transmit signal into an analog self-interference cancellation signal by combining a set of filtered, scaled, and/or delayed versions of the analog transmit signal, but may additionally or alternatively be implemented as any suitable circuit. For instance, the analog self-interference canceller 131 may perform a transformation involving only a single version or copy of the analog transmit signal. The transformed signal (i.e. the analog self-interference cancellation signal) preferably represents at least a part of the self-interference component received at a coupling point of the relay 100 to a communications link (e.g. a receive antenna).

The analog self-interference canceller 131 is preferably adaptable to changing self-interference parameters in addition to changes in the analog transmit signal; for example, transmitter temperature, ambient temperature, antenna configuration, humidity, and transmitter power. Adaptation of the analog self-interference canceller 131 is preferably performed by a control circuit or other control mechanism included in the canceller 131, but may additionally or alternatively be performed by any suitable controller.

The analog self-interference canceller 131 is preferably coupled to signal paths by short section directional transmission line couplers, but may additionally or alternatively be coupled by any power dividers, power combiners, directional couplers, or other types of signal splitters suitable for coupling signal paths of the relay 100 to the analog self-interference canceller 131.

The digital self-interference canceller 132 functions to reduce self-interference in the relay 100 by canceling self-interference components present in digital receive signals. The digital self-interference canceller 132 preferably performs both linear and non-linear digital self-interference cancellation, but alternatively may only perform one of the two.

The digital self-interference canceller 132 preferably reduces digital self-interference by sampling one or more digital transmit signals and generating one or more digital self-interference cancellation signals based on input sampled digital transmit signals (and a transform configuration). Digital self-interference cancellation signals may be combined with corresponding receive signals at any time or location. The digital self-interference canceller 132 preferably removes self-interference signal components not removed by analog self-interference cancellers 131.

The digital self-interference canceller 132 preferably samples digital transmit signals of the relay 100 (additionally or alternatively, the canceller 132 may sample analog transmit signals or any other suitable transmit signals) and transforms the digital transmit signals to digital self-interference cancellation signals based on one or more digital transform configurations. The digital transform configuration preferably includes settings that dictate how the digital self-interference canceller 132 transforms a digital transmit signal to a digital self-interference cancellation signal (e.g. coefficients of a generalized memory polynomial used to transform the transmit signal to a self-interference signal).

Figure 7A:
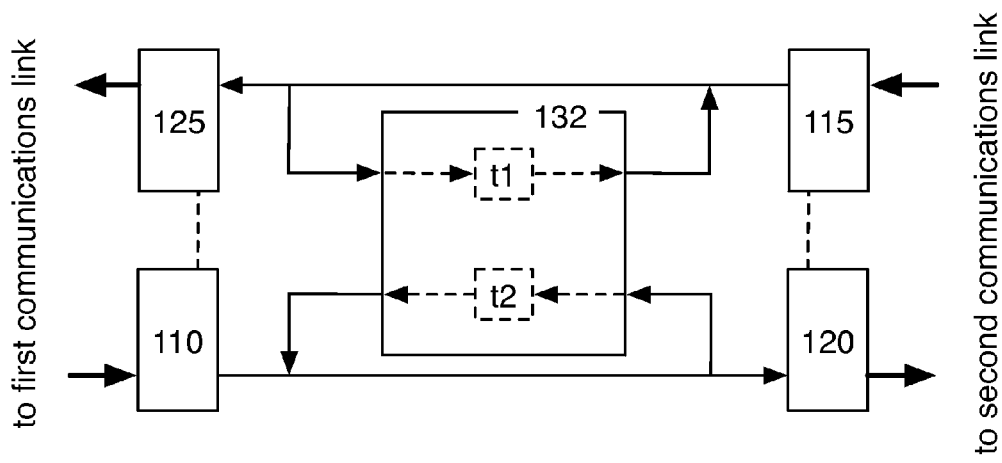
FIGS. 7A and 7B are diagram representations of a digital self-interference canceller of a system of a preferred embodiment.

The digital self-interference canceller 132 preferably generates self-interference cancellation signals for a given digital receive signal from a corresponding direction digital transmit signal as shown in FIG. 7A (e.g., the self-interference cancellation signal combined with a re-transmitted uplink signal is preferably generated from the received uplink signal). Additionally or alternatively, the digital self-interference canceller 132 may generate self-interference cancellation signals for a given digital receive signal from any other transmit signal or combination of transmit signals (including analog transmit signals converted using ADCs).

Figure 7B:
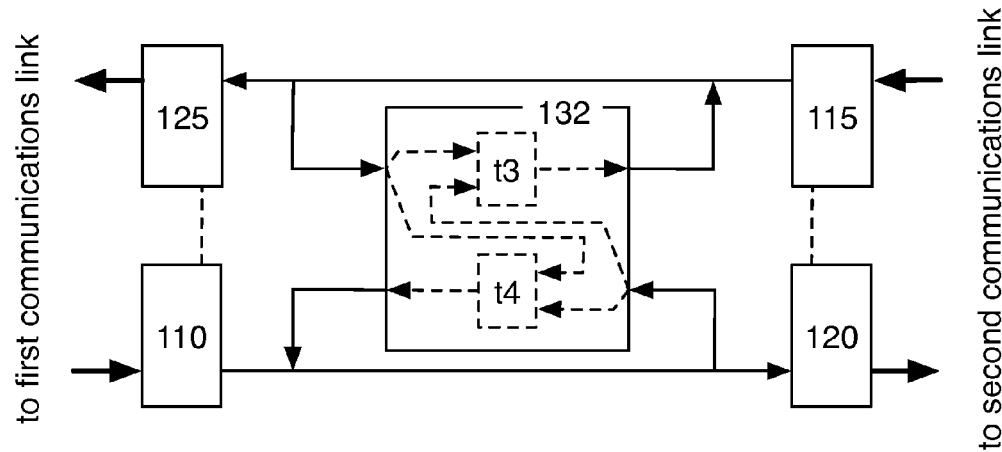

For example, in situations where the relay 100 relays bi-directional communication (e.g., uplink/downlink) on well-separated frequencies, self-interference in the downlink receiver occurring from the uplink transmitter may be negligible (or vice versa); however, in situations where the uplink and downlink frequencies are closer, self-interference may occur across channels. In these situations it might be desirable to have hetero-channel as well as homo-channel self-interference cancellation, as shown in FIG. 7B.

Each self-interference cancellation signal generated by the digital self-interference canceller 132 is preferably associated with a configuration transform (e.g., t1, t2, t3, and t4 of FIGS. 7A and 7B); additionally or alternatively, configuration transforms may be associated with digital self-interference cancellation signals in any suitable manner.

Figure 8:
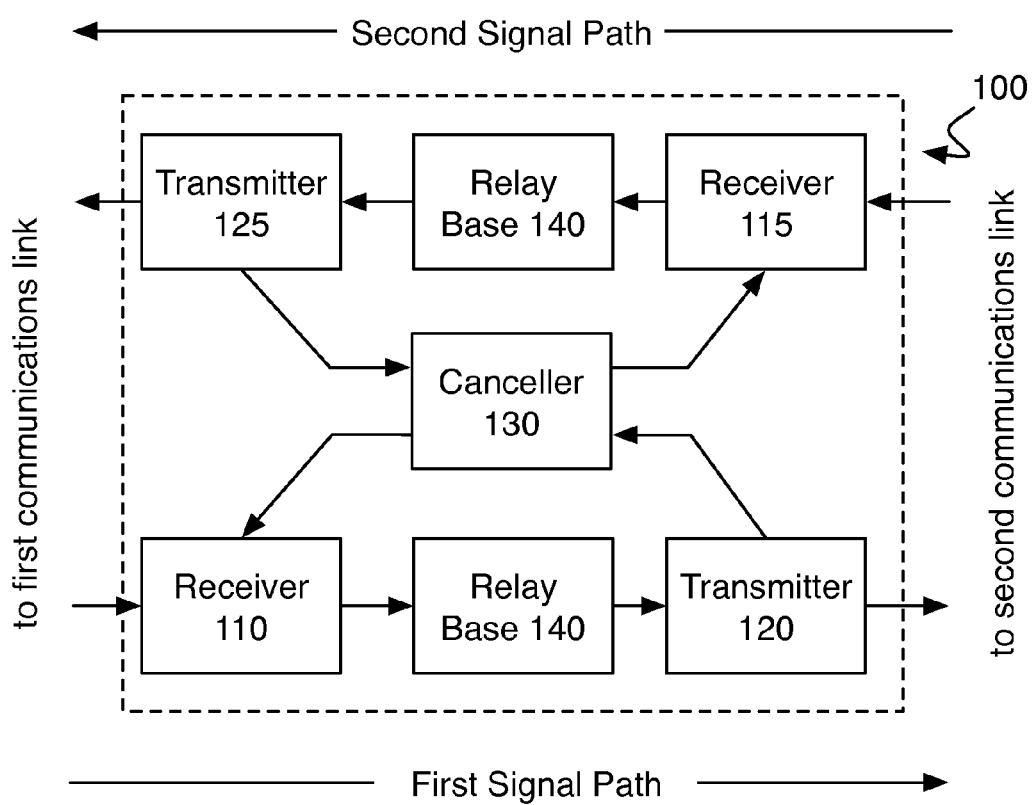
FIG. 8 is a diagram representation of a system of a preferred embodiment.

In the above description of the preferred embodiments, it is mentioned that the relay 100 may form transmit signals by processing receive signals (e.g., by phase shifting, amplifying, attenuating, frequency shifting, etc.). In a variation of a preferred embodiment, processing may be performed by relay bases 140 positioned between transmitters and receivers, as shown in FIG. 8. A relay base 140 may be a layer 1 (L1) relay, a layer 2 (L2) relay, a layer 3 (L3) relay, or any other suitable relay. Relay bases 140 preferably function to prepare signals for retransmission; for example, a relay base 140 may reorganize information before retransmitting to increase transmission efficiency. As another example, a relay base 140 may delay a signal before retransmission to time it with a particular transmission window.

Figure 9:
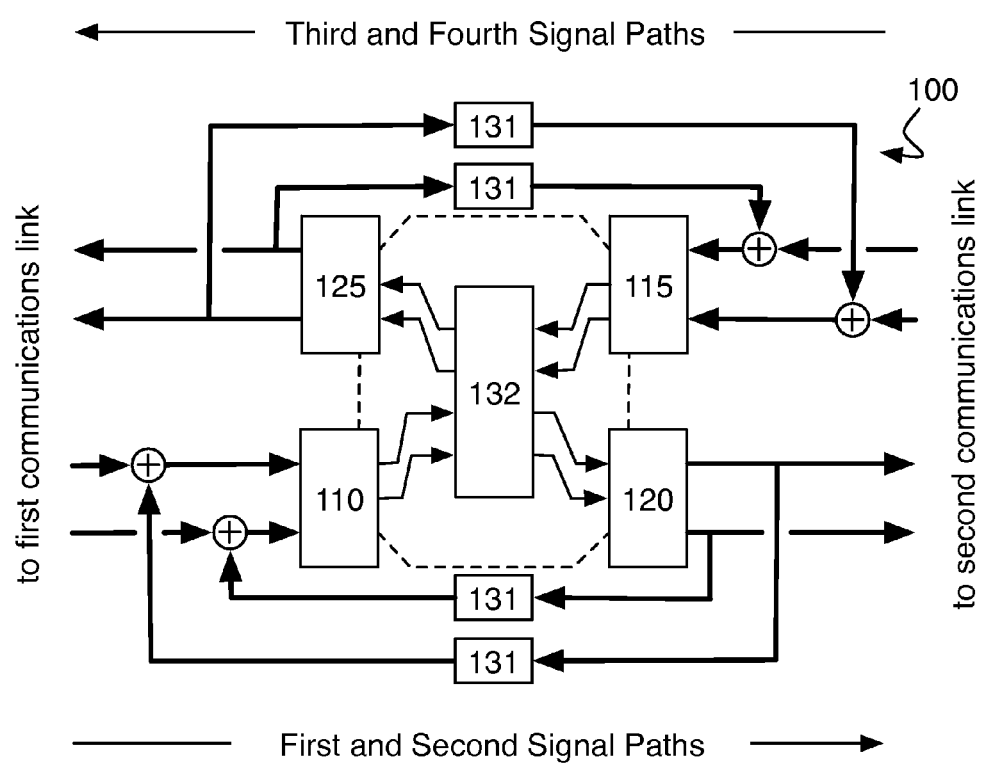
FIG. 9 is a diagram representation of a system of a preferred embodiment.

While the examples above are directed to single-in/single-out (SISO) relays, it is understood that the relay 100 may also be used for multiple-in/multiple-out (MIMO) communications, as shown in FIG. 9. MIMO technology may offer increased data throughput and link range without the need for additional bandwidth or increased transmitter power.

Figure 10A:
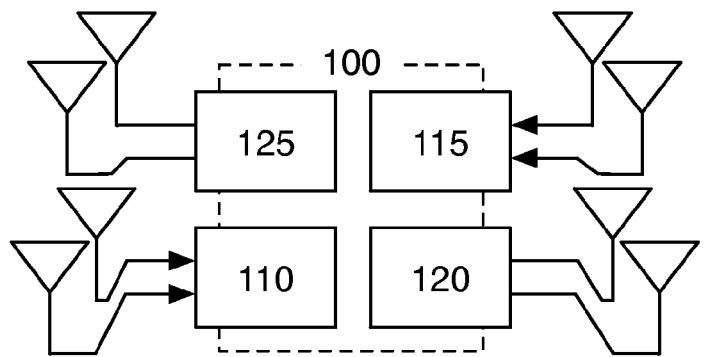
FIGS. 10A, 10B and 10C are diagram representations of antenna couplings of a system of a preferred embodiment.
Figure 10B:
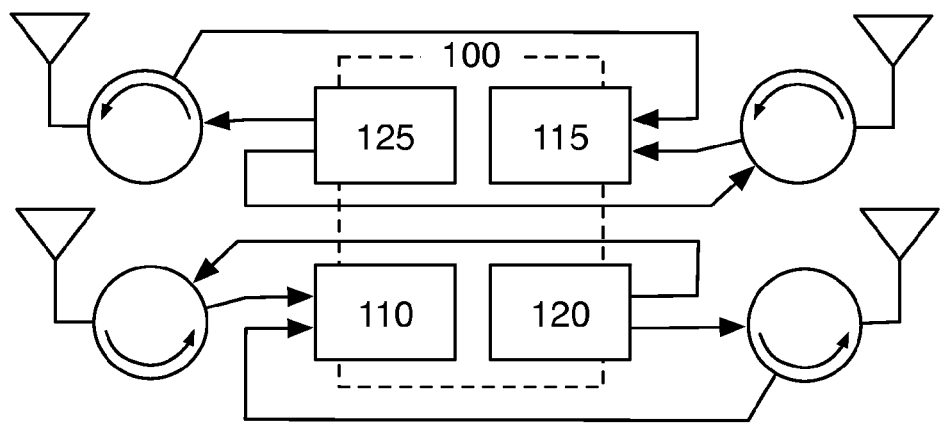
Figure 10C:
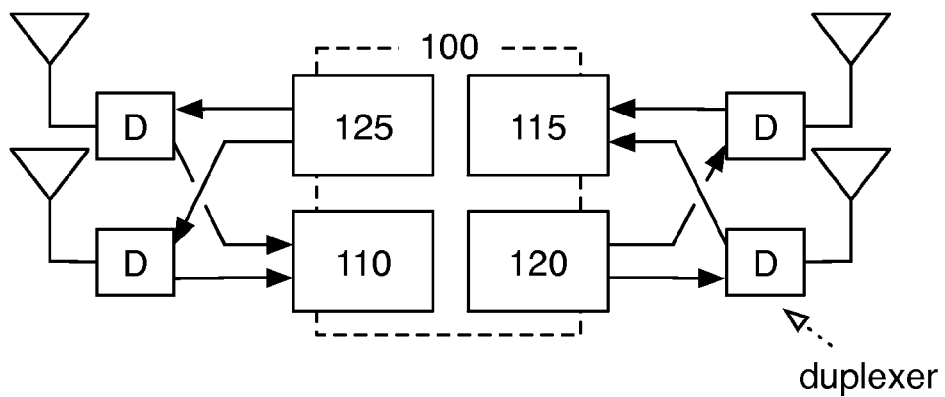

The example relay 100 as shown in FIG. 9 represents a 2×2 MIMO system, but it is understood that the relay 100 may additionally or alternatively utilize any suitable number of transmit and receive signals. Each signal path may have separate antennas; alternatively, signal paths may share antennas via a duplexer or other coupler. In one example, each signal path of a 2×2 MIMO relay has four antennas: a TX1 antenna, a TX2 antenna, an RX1 antenna, and an RX2 antenna, as shown in FIG. 10A. In another example, each signal path of a 2×2 MIMO system has two antennas: a TX1/RX1 antenna (coupled to both TX1 and RX1 signal paths via a circulator) and a TX2/RX2 antenna (coupled to both TX2 and RX2 signal paths via a circulator), as shown in FIG. 10B. In a third example, each signal path of a 2×2 MIMO system is again associated with four antennas, but the relay 100 has only four antennas total; a duplexer is used to couple each antenna to both a TX and an RX signal (where the TX and RX signals are from different signal paths), as shown in FIG. 10C.

As shown in FIGS. 10A and 10B, the first and second transmitters 120 and 125 are preferably implementations having multiple inputs and outputs. In particular, each transmitter preferably includes a DAC and frequency upconverter for each transmit signal path; additionally or alternatively, transmit signal paths may share DACs and/or frequency upconverters. Additionally or alternatively, each transmitter may be any suitable MIMO transmitter; for example, transmitters may include MIMO signal splitting or processing circuitry (which may be used to process a single digital signal into multiple MIMO analog signals).

The first and second receivers 110 and 115 are preferably implementations having multiple inputs and outputs. In particular, each receiver preferably includes an ADC and frequency downconverter for each receive signal path; additionally or alternatively, receive signal paths may share ADCs and/or frequency downconverters. Additionally or alternatively, receivers may be any suitable MIMO receiver; for example, receivers may include MIMO signal splitting or processing circuitry (which may be used to process multiple MIMO analog signals into a single digital signal).

Figure 11:
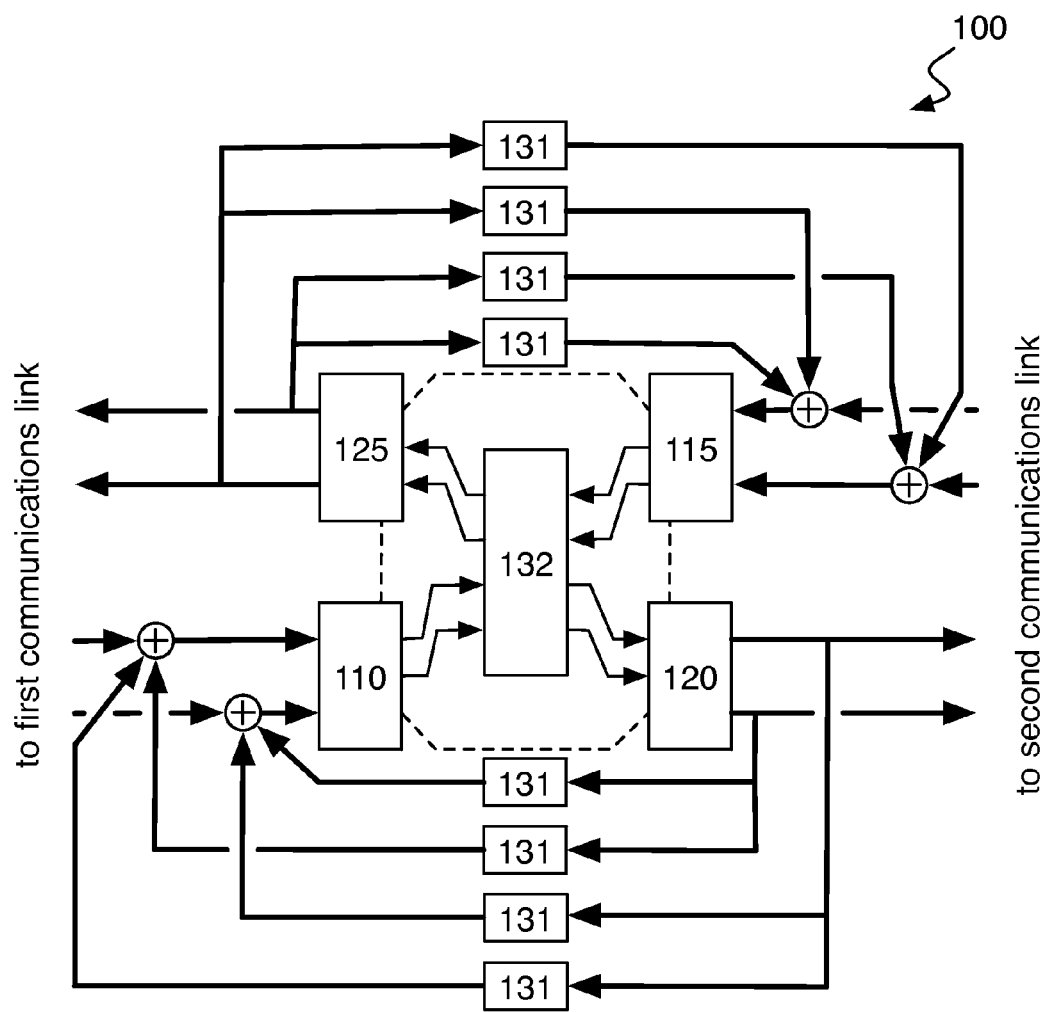
FIG. 11 is a diagram representation of a system of a preferred embodiment.

In an embodiment of the relay 100 designed for MIMO operating environments (i.e., multiple transmit and/or receive signals), the relay 100 preferably includes analog self-interference cancellers 131 for each pair of receive/transmit signals, as shown in FIG. 9. In MIMO operating environments, self-interference may occur across communications streams in addition to in them; for example, a TX1 signal may cause interference in both of RX1 and RX2 signals. As a result, the relay 100 may additionally or alternatively include analog self-interference cancellers 131 for self-interference cancellation across communications streams, as shown in FIG. 11. Cross-stream cancellation may additionally or alternatively be combined with cross-directional cancellation (which is as shown in FIG. 6).

In an embodiment of the relay 100 designed for MIMO operating environments (i.e., multiple transmit and/or receive signals), the digital self-interference canceller 132 may perform digital self-interference cancellation on each MIMO digital receive signal, but may additionally or alternatively perform digital self-interference cancellation on a combined digital receive signal (resulting from the combination of MIMO digital receive signals). If the digital self-interference canceller 132 performs self-interference cancellation for multiple MIMO digital receive signals, cancellation may be performed for each TX/RX pairing, similarly to those described in the section on the analog self-interference canceller 131.

As a person skilled in the art will recognize from the previous detailed description and from the figures and claims, modifications and changes can be made to the preferred embodiments of the invention without departing from the scope of this invention defined in the following claims.

We claim:

1. A single-input, single-output relay comprising:
   a first transmitter, coupled to a first signal path of the relay, that converts a first digital transmit signal received via the first signal path to a first analog transmit signal, and transmits the first analog transmit signal via the first signal path;
   a first receiver, coupled to the first signal path of the relay, that receives a first analog receive signal via the first signal path, and converts the first analog receive signal to a first digital receive signal;
   a second transmitter, coupled to a second signal path of the relay, that converts a second digital transmit signal received via the second signal path to a second analog transmit signal, and transmits the second analog transmit signal via the second signal path;
   a second receiver, coupled to the second signal path of the relay, that receives a second analog receive signal via the second signal path, and converts the second analog receive signal to a second digital receive signal;
   a first analog self-interference canceller that generates, in the RF domain and without performing frequency downconversion, a first self-interference cancellation signal based on the first analog transmit signal, and combines the first self-interference cancellation signal with the first analog receive signal;
   a second analog self-interference canceller that generates, in the RF domain and without performing frequency downconversion, a second self-interference cancellation signal based on the second analog transmit signal, and combines the second self-interference cancellation signal with the second analog receive signal;
   a third analog self-interference canceller that generates, in the RF domain and without performing frequency downconversion, a third self-interference cancellation signal based on the first analog transmit signal, and combines the third self-interference cancellation signal with the second analog receive signal; and
   a fourth analog self-interference canceller that generates, in the RF domain and without performing frequency downconversion, a fourth self-interference cancellation signal based on the second analog transmit signal, and combines the fourth self-interference cancellation signal with the first analog receive signal;
   wherein the first transmitter and the second transmitter may transmit simultaneously.

2. The relay of claim 1, wherein the first digital transmit signal is substantially similar to the first digital receive signal; wherein the second digital transmit signal is substantially similar to the second digital receive signal.

3. The relay of claim 1, wherein the first, second, third, and fourth analog self-interference cancellers generate self-interference cancellation signals by combining filtered, scaled, and delayed versions of analog transmit signals.

4. The relay of claim 1, further comprising a digital self-interference canceller, wherein the digital self-interference canceller generates a fifth self-interference cancellation signal based on the first digital transmit signal; wherein the fifth self-interference cancellation signal is combined with the first digital receive signal.

5. The relay of claim 4, wherein the digital self-interference canceller generates a sixth self-interference cancellation signal based on the second digital transmit signal; wherein the sixth self-interference cancellation signal is combined with the second digital receive signal.

6. The relay of claim 5, wherein the fifth self-interference cancellation signal is generated based on both of the first and second digital transmit signals; wherein the sixth self-interference cancellation signal is generated based on both of the first and second digital transmit signals.

7. The relay of claim 5, wherein the digital self-interference canceller generates the fifth and sixth self-interference cancellation signals according to a digital transform configuration.

8. A MIMO relay comprising:
   a first transmitter, that communicates with a first wireless communication device, coupled to first and second signal paths of the relay, that converts first and second digital transmit signals received via the first and second signal paths to first and second analog transmit signals, and transmits the first and second analog transmit signals via the first and second signal paths;
   a first receiver, that communicates with the first wireless communication device, coupled to the first and second signal paths of the relay, that receives first and second analog receive signals via the first and second signal paths, and converts the first and second analog receive signals to first and second digital receive signals;
   a second transmitter, that communicates with a second wireless communication device independent from the first wireless communication device, coupled to third and fourth signal paths of the relay, that converts third and fourth digital transmit signals received via the third and fourth signal paths to third and fourth analog transmit signals, and transmits the third and fourth analog transmit signals via the third and fourth signal paths;
   a second receiver, that communicates with the second wireless communication device, coupled to the third and fourth signal paths of the relay, that receives third and fourth analog receive signals via the third and fourth signal paths, and converts the third and fourth analog receive signals to third and fourth digital receive signals;
   a first analog self-interference canceller that generates, in the RF domain and without performing frequency downconversion, a first self-interference cancellation signal based on the first analog transmit signal and combines the first self-interference signal with the first analog receive signal;
   a second analog self-interference canceller that generates a second self-interference cancellation signal based on the second analog transmit signal and combines the second self-interference signal with the second analog receive signal;
   a third analog self-interference canceller that generates a third self-interference cancellation signal based on the third analog transmit signal and combines the third self-interference signal with the third analog receive signal;

a fourth analog self-interference canceller that generates a fourth self-interference cancellation signal based on the fourth analog transmit signal and combines the fourth self-interference signal with the fourth analog receive signal;

a fifth analog self-interference canceller that generates a fifth self-interference cancellation signal from the first analog transmit signal and combines the fifth self-interference cancellation signal with the second analog receive signal;

a sixth analog self-interference canceller that generates a sixth self-interference cancellation signal from the second analog transmit signal and combines the sixth self-interference cancellation signal with the first analog receive signal;

a seventh analog self-interference canceller that generates a seventh self-interference cancellation signal from the first analog transmit signal and combines the seventh self-interference cancellation signal with the fourth analog receive signal; and an eighth analog self-interference canceller that generates an eighth self-interference cancellation signal from the second analog transmit signal and combines the eighth self-interference cancellation signal with the third analog receive signal;

wherein the first transmitter and the second transmitter may transmit simultaneously.

* * * * *